United States Patent Office 3,594,127
Patented July 20, 1971

3,594,127
METHODS AND SYSTEMS FOR MONITORING AND/OR CONTROLLING THE CONSTITUENT-POTENTIAL OF HEAT - TREATING ATMOSPHERES
Raymond L. Davis II, Newtown Square, Pa., assignor to Leeds & Northrup Company, Philadelphia, Pa.
Filed May 24, 1968, Ser. No. 731,876
Int. Cl. C21d 1/00; G01n 31/10
U.S. Cl. 23—232      11 Claims

ABSTRACT OF THE DISCLOSURE

Various generically similar but specifically different methods and systems providing for accelerated response of a constituent-potential detector to changes in constituent-transfer ability by altering the atmosphere to the detector to form an atmosphere therearound having faster net constituent-transfer ability than the atmosphere sample normally conducted from a space, such as the work chamber of a heat-treating furnace which is being monitored or controlled, particularly a furnace employing a carburizing-type atmosphere.

BACKGROUND OF THE INVENTION

In the prior art, as exemplified by U.S. Letters Patent Nos. 2,541,857, 2,698,222, 3,011,873, 3,058,813, 3,084,999 and 3,123,323, the constituent-potential or the constituent-transfer ability of a heat-treating furnace has been regulated in accordance with the response of a constituent-potential detector supplied with a sample stream of the atmosphere surrounding the work in a heat-treating furnace. In practice, various cycling and overshoot problems, solved by the present invention, were encountered.

SUMMARY OF THE INVENTION

In accordance with the present invention, it is recognized that many of the problems frequently previously encountered arose not because of lack of sensitivity of the detector but because of the time required for its composition to come to equilibrium with the constituent-potential of the heat-treating atmosphere. Significantly to reduce this time, particularly upon occurrence of large abrupt or rapid change of the composition or state of the sample stream, it is provided that upon such occurrence, the sample stream is modified in composition or condition, or temporarily replaced by another gas or atmosphere of composition or condition, which in effect accelerates the detector response so that it more closely approaches the equilibrium it should have when again subjected to the sample.

In some embodiments of the invention, such accelerated response is effected by increasing the constituent-transfer ability of the sample gas by subjecting it to action of a catalyst, so temporarily to modify its condition. In other embodiments, the sample gas is temporarily modified by addition of fuel gas, and in other embodiments, the sample gas is temporarily modified by addition of air; and in still other embodiments, the sample gas is temporarily replaced by another gas of different constituent-potential or constituent-transfer ability.

The invention further resides in features of construction, combination and arrangement hereinafter described and claimed.

BRIEF DESCRIPTION OF THE DRAWINGS

For a more detailed understanding of the invention, reference is made in the following description of preferred embodiments thereof to the accompanying drawings in which.

DESCRIPTION OF PREFERRED EMBODIMENTS

Figure 1:
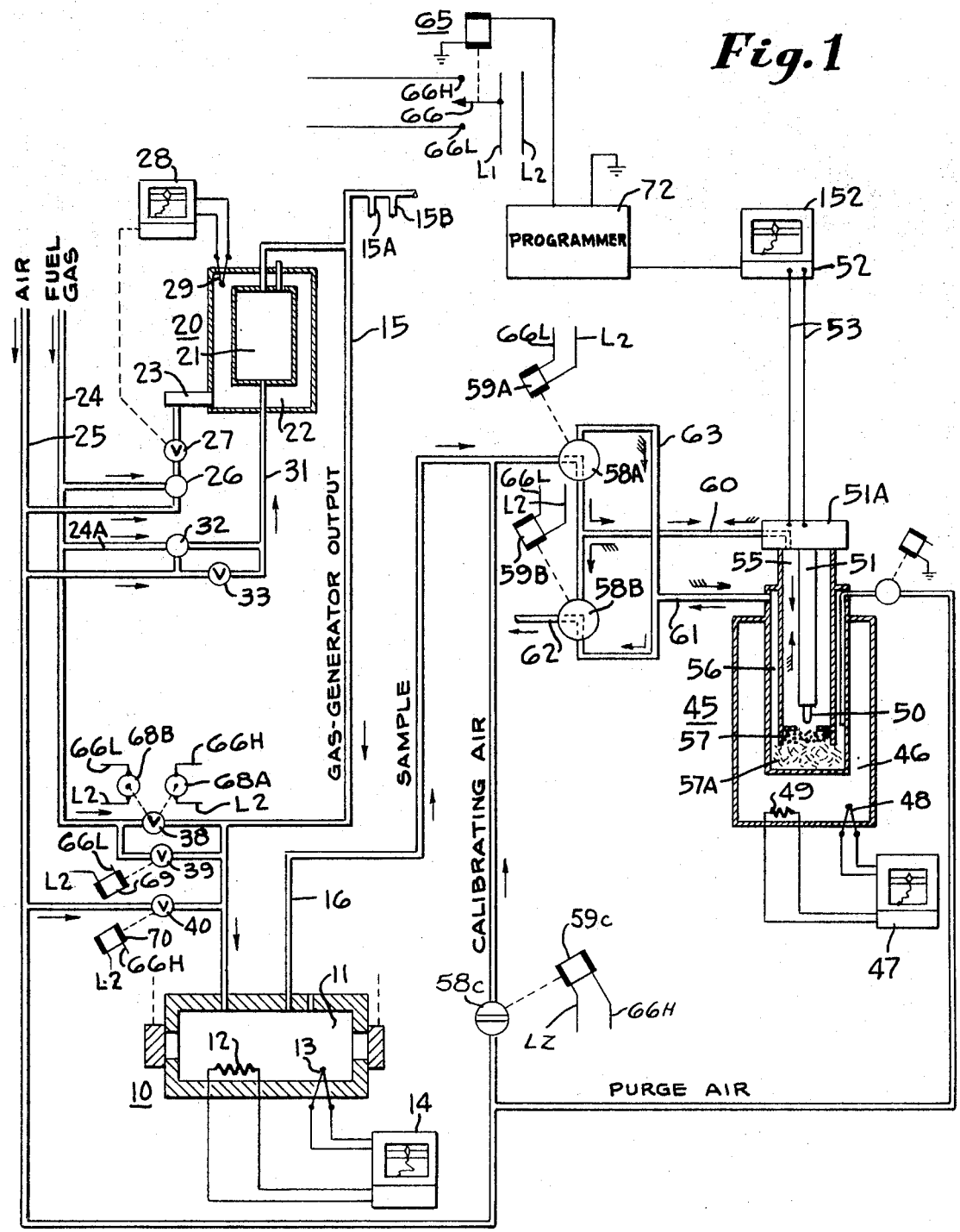
FIG. 1 schematically illustrates a typical heat-treating system in which the sample stream may be modified by subjecting it to a catalyst within the detector.

Referring to FIG. 1 as exemplary of a heat-treating system embodying the invention, the work furnace 10 has a treating chamber 11 in which gears, shafts or other work is disposed. The atmosphere, and thereby the work in the furnace, is heated to desired temperature by suitable means, for example, an electric heater 12. Supply of current to heater 12 is controlled by a recorder-controller 14. The thermocouple 13, or equivalent detector, is responsive to changes in temperature of the furnace atmosphere. Upon deviation from a desired set-point temperature, as sensed by the thermocouple, the controller 14 varies the heat input to the furnace and maintains the temperature of the atmosphere substantially constant at the set-point value, for example, 1700° F.

The treating chamber 11 is supplied with a carburizing, nitriding or other reactive gas suited for the desired heat-treatment of the work via the gas-generator output line 15. For monitoring and/or controlling the constituent-potential of the reactive atmosphere of the furnace, a sample stream of furnace atmosphere is supplied via sample line 16 to a detector 45 generally similar to those disclosed in the aforesaid Letters Patent.

Gas generator 20 has an inner chamber 21 in which is producer a carrier gas supplied by it via output line 15 to the work furnace 10. The outer chamber 22 of the gas generator 20 is supplied with hot gases by the burner 23. Fuel gas and air from supply lines 24, 25 are commingled in a mixer 26 and passed, under control of throttling valve 27, to the burner. The temperature of the burning gases in the outer chamber 22 is held substantially constant at a desired value, for example, 1900° F., by a regulating system exemplified by recorder-controller 28 and thermocouple 29.

A suitable carrier gas is produced in the inner chamber 21 of generator 20 by using a mixture of fuel gas and air from the supply lines 24, 25. The gas and air as combined in the mixer 32 are supplied via generator input line 31 to the inner chamber 21 of the gas generator. The throttling valve 33 is set to vary the amount of additional air supplied to input line 31 of generator 20.

The same generator 20 may supply carrier gas, as via output lines 15A et seq. to other work furnaces in order that each work furnace may be provided with an atmosphere of composition suited for its work requirements. The output lines 15 et seq. may each be provided with an arrangement for enriching or diluting the carrier gas, thereby to control the carburizing potential thereof. Specifically, additional fuel gas, i.e., natural gas or equivalent, may be supplied to line 15 via throttling valve 38 and ON/OFF valve 39, both under control of detector 45 as later described. Additional air may be supplied to line 15 via ON/OFF valve 40 under control of detector 45.

The detector 45 of FIG. 1 comprises a heated chamber 46 whose atmospheric temperature is maintained substantially constant at say 1500–1800° F. by any suitable arrangement. Specifically, the recorder-controller 47 in response to deviations from its set-point as detected by thermocouple 48, or equivalent, varies the input to heater 49 or equivalent heat-generating means. The sensitive element 50 of detector 45 is at the lower end of a probe 51 having internal conductors for connection via conductors 53 to the controller 52 which has a recorder 152 associated therewith.

The probe 51 extends through closure member 51A into the inner chamber 55 of a dual chamber arrangement. At its lower end, chamber 55 is in communication with a second surrounding chamber 56 through a porous mass of catalyst 57 which may include a scavenging material 57A.

The valve means 58A, 58B are provided to subject the sensitive element 50 of the constituent-potential detector 45 either to unmodified work-treating atmosphere or to such atmosphere modified to provide an accelerated response during start-up conditions of the work-treating furnace and/or upon transfer of the detector 45 from one to another of the sampling lines of different work furnaces, or regions from which atmosphere samples are taken—set for different levels of control.

With the valves 58A, 58B in the position shown in FIG. 1, the sample stream from furnace 10 flows through valve 58A, line 60 downwardly through inner detector chamber 55 for contact with sensitive element 50, through catalyst 57, unwardly through outer detector chamber 56, line 61 and through valve 58B to vent line 62. This flow is indicated in FIG. 1 by the unfeathered arrows.

When, as explained in aforesaid Pat. No. 2,541,857, the composition of the sensitive element is in equilibrium with the composition of such unmodified sample stream, the electrical resistance of the sensitive element 50 is a measure of the carburizing potential of the atmosphere in the work furnace 10. However, because of a chemical or metallurgical inertia of the detector, it may not be capable of closely and rapidly following changes in the carburizing potential of the gas sample such as occur, for example, during start-up conditions. At start-up, large changes of potential occur, but the sample gas lacks the capability for rapid transfer of carbon to and from the detector. Such changes may also occur during transfer from one sample stream to another.

With the valves 58A, 58B rotated a quarter turn in clockwise direction from the position shown in FIG. 1, the sample stream from furnace 10 flows through valve 58A, line 63, line 61, downwardly through outer detector chamber 56, through scavenger 57A and catalyst 57 for contact with sensitive element 50 upwardly through inner chamber 55, out via line 60 and through valve 58B to vent line 62. During this reversed flow position of valves 58A, 58B, the sample stream is modified or conditioned by the action of the catalyst so that flowing over the sensitive detector element 50, the catalyzed gas is capable of more rapid transfer of carbon to the sensitive element 50 as well as transfer to a substantially higher level of carbon in sensitive element 50.

Figure 1C:
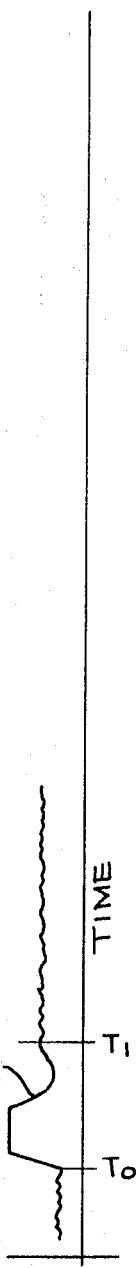
FIGS. 1A, 1B and 1C are curves referred to in discussion of FIG. 1 and later figures.
Figure 1B:
Figure 1A:
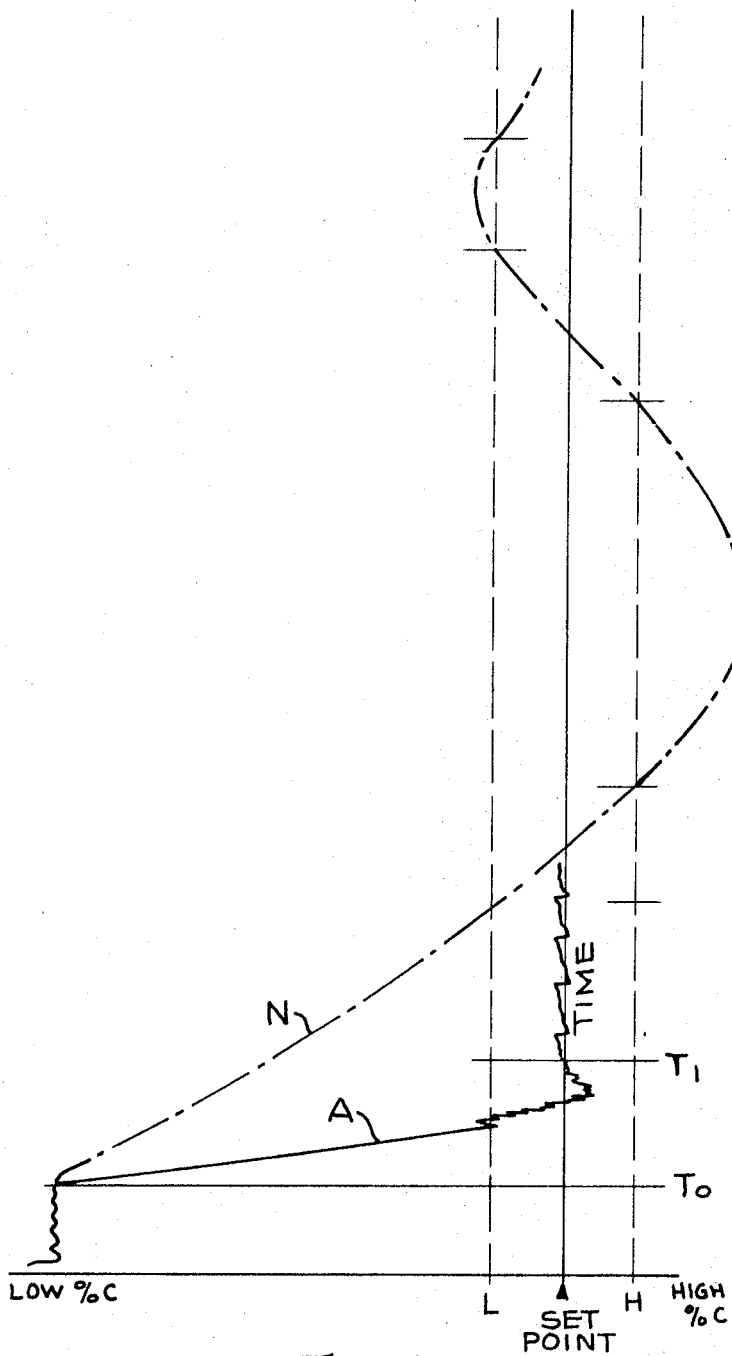

The valves 58A, 58B may be operated by the solenoids 59A, 59B of the controller 52. FIGS. 1A–1C are representations of a section of chart from a recorder 152 associated with controller 52. The controller may be of form identified as a Position-Adjusting Type such as shown in U.S. Pat. 3,295,033. Such controllers having adjustable proportional band and reset action are commercially available and known to those skilled in the art. When the response of the detector 45 is below the lower limit L (FIG. 1A) of the proportional band, the solenoids 59A, 59B are continuously energized via contacts 66, 66L of the control relay 65 of controller 52. Valves 58A, 58B are thus maintained in their reversed flow position so that the sensitive element 50 is subjected to a highly active or modified sample stream for accelerated response (Curve A, FIG. 1A) of the detector 45 and the control valve 38 will simultaneously be operated by motor 68B to possibly full-stroke the valve 38 to its fully-open position. At the same time, solenoid valve 39 will be held open by solenoid 69, also energized via contacts 66, 66L of relay 65. This continuously adds fuel gas to the carrier gas in line 15 to increase the carburizing potential of the furnace atmosphere. While not shown, a controller of this type includes reset action which results in a temporary shift of the proportional band to the left. This shift will be appreciable when the rate of change of the controlled condition as sensed by the detector is rapid and results in an anticipatory action which begins to produce pulses at relay 65 of character which closes contacts 66, 66H to provide closing movements of valve 38 by motor 68A substantially before attainment of the set-point. This shift of proportional band will fade as the detector settles down in the proportional band and will disappear when the detector is maintained at the set-point. The time required for disappearance depends upon the rate of reset used.

When the carburizing potential has increased sufficiently for the detector 45 to sense the controlled condition as being in the proportional band (between lines L and H of FIG. 1A), or shifted as above described, the controller output changes to a series of pulses which become shorter and shorter and which are spaced farther and farther apart as the condition approaches the control point. When the condition is at the control point, the pulses disappear. During operation of the controller as just described, the solenoids 59A and 59B are first continuously energized and thereafter repeatedly energized and deenergized for short periods alternately to subject the detector element 50 to the modified and unmodified sample streams quickly to bring the detector into equilibrium at the desired set-point within the time interval T0–T1 (FIG. 1A).

To hold the treating atmosphere of chamber 11 of the work furnace 10 at the desired set-point, despite variation of operating parameters including fuel quality, etc., the controller 52 controls the various valve 38, 39, 40 which provide for enrichment or dilution of the gas-generator output as supplied via line 15 to furnace 10. Specifically, signals from the controller 52 are applied to the three-position directional relay 65 in manner above described.

As shown by Curve PA (FIG. 1B), the throttling valve 38 of FIG. 1, upon start-up or change in set-point at time T0, comes quickly (in the time interval T0–T1) to the proportional setting corresponding with the desired point for the work being treated.

In absence of the present invention providing for accelerated response, detector 45 is sometimes incapable of rapidly and closely following the changes in composition of the treating gas; its response before equilibrium is attained is much slower, as exemplified by Curve N of FIG. 1A. Also without the present invention, the throttling valve 38 repeatedly cycles between its fully-open and fully-closed positions before it settles down to a throttling action close to the setting corresponding with the desired set-point. With such delay in the stabilization of the detector and of the valve, the sequential monitoring and control of two or more heat-treating furnaces has been unsatisfactory when all of them are not to be operated at the same carburizing set-point.

Figure 2:
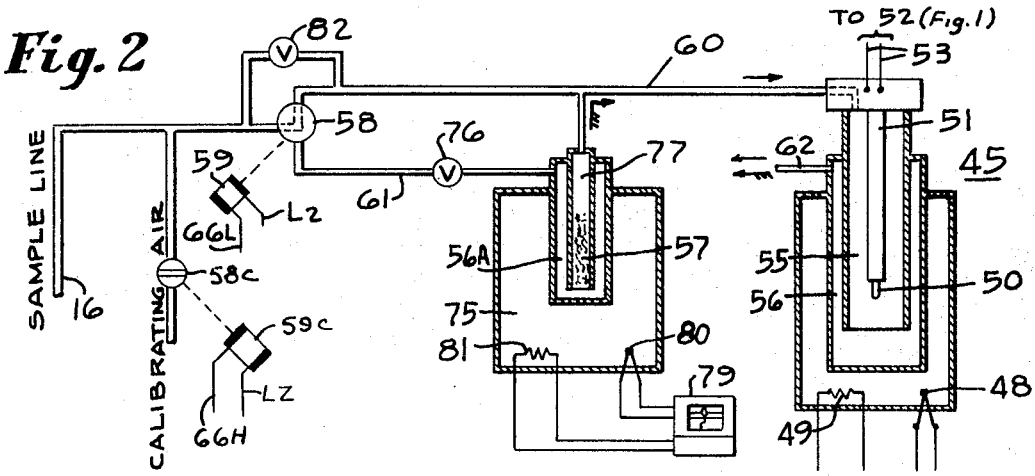
FIG. 2 schematically illustrates a modification of part of FIG. 1 with the catalyst in a heating unit separate from the detector.

In the arrangement shown in FIG. 2, the catalyst instead of being within the detector assembly 45, as in FIG. 1, is disposed within a separate heated space 75 similar to space 46 of FIG. 1. Instead of a separate space 75, the catalyst tube assembly providing spaces 56A and 77 may be disposed in the space 22 of the gas generator 20 shown in FIG. 1. With the catalyst heated separately, only a single valve 58 is necessary to provide for flow to detector 45 of either the modified or unmodified sample stream from the work furnace. specifically, with valve 58 in the position shown, the sample stream flows from sample line 16 through valve 58, through line 60 to detector 45, downwardly through the inner chamber 55 of the detector for contact with the sensitive element 50, and upwardly through outer chamber 56 to the vent line 62. With valve 58 rotated one-quarter turn in a counterclockwise direction from the position shown, the sample stream flows from sample line 16 through valve 58, through line 61 which may include a throttling valve 76, to chamber 56A upwardly through catalyst 57 in inner chamber 77 by way of line 60 to detector 45, downwardly through inner chamber 55, and upwardly through outer chamber 56 to vent line 62.

The separate heated space 75 for the catalyst 57 may be maintained at temperatures higher than 1800° F. which would be excessive for the detector 45 of FIG. 1. Specifically, for example, the separate heated space 75 may be provided with a controller 79 which in response to deviations from its set-point, as sensed by thermocouple 80, changes the input to the heater 81.

To provide for modiulation of the effect of the catalyst, the arrangement may include a by-pass valve 82, manually set for only a percentage of the total sample flow to be diverted through the catalyst 57 before rejoining the remainder of the sample flow, and then passing over the detector element 50. Valve 58 may be operable by solenoid 59 under control of controller 52 (FIG. 1).

Another advantage of this arrangement is that the catalyst can be maintained at all times at a preferred temperature for efficient and trouble-free operation. Still another advantage is that the flushing action of the sample flow as it passes through chambers 55, 56 is not impaired by a succession of reversals.

Figure 3:
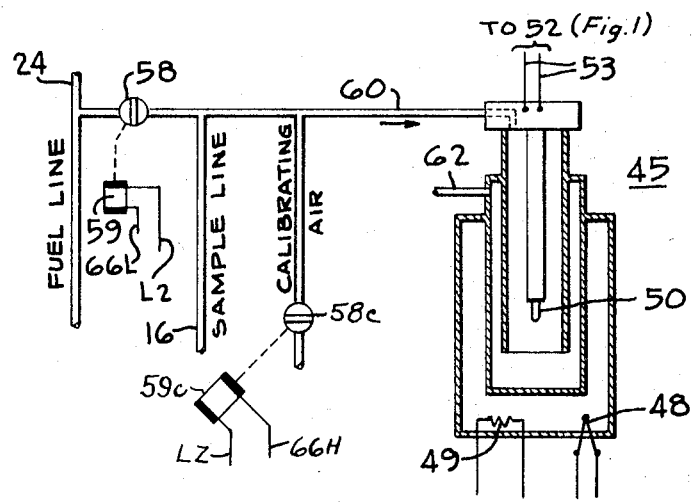
FIGS. 3, 4 and 5 schematically illustrate modifications of part of FIG. 1 in which a different gas or atmosphere is temporarily substituted for the sample stream.

In the arrangement shown in FIG. 3, instead of catalyzing the sample for accelerated response of the detector, fuel gas from line 24 is temporarily added to the sample up-stream of detector 45 via the normally-closed solenoid 58 controlled by the controller 52 associated with the detector (see controller 52 of FIG. 1). Whenever the response of detector 45 deviates down-scale from the set-point, solenoid 59 is pulsed to open valve 58 and so admit fuel gas to the sample stream flowing via line 60 to the detector. The added fuel gas is supplied at low rate and only for short pulses if the response is within the proportional band. The detector responds almost instantly to such addition and arrests the down-scale deviation or even climbs a small amount. The pulse is effective, as in the system of FIG. 1, to change the setting of valve 38 in corrective sense, but if the correction is inadequate, the response of detector 45 again moves down-scale since the fuel gas addition to the sample stream produces only a transient effect.

The net effect of the fuel-gas pulses is to tend to hold the detector 45 at or near the set-point of controller 52 (Curve 1, FIG. 1A) while the motorized valve means 38 (FIG. 1) is readjusting. Eventually because of such readjustment, the detector 45 and the atmosphere in work furnace 10 will be held at the set-point by the unmodified sample of the treating atmosphere. The accelerated response of the detector 45, due to the pulsed fuel gas addition to the sample stream (Curve A, FIG. 1A), is anticipatory of the change in composition of the treating atmosphere produced by the motorized valve means 38 and avoids undesired cycling situations (Curve N, FIG. 1A: Curve PN, FIG. 1C).

Figure 4:
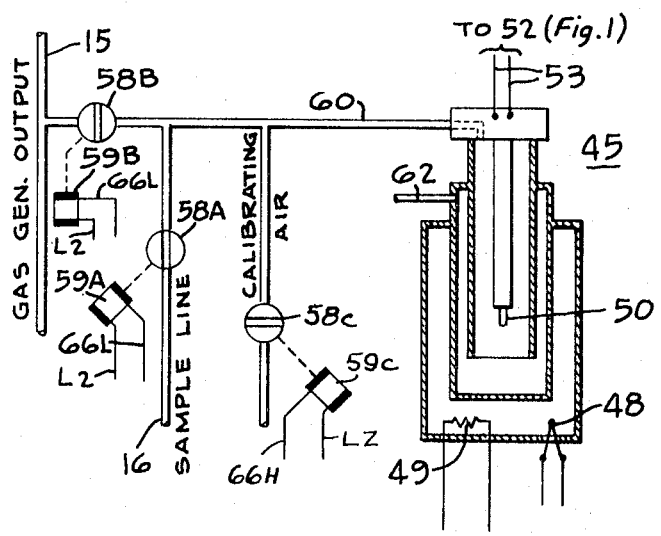

The arrangement shown in FIG. 4 is similar to that of FIG. 3 except that the solenoid valve means cuts off the work furnace sample and substitutes well reacted carrier gas available from the generator output line 15. The action is similar to that of FIG. 3 except in the following respect. The sample gas may at times be poorly conditioned; when this is so, even with fuel gas additions, may not provide fast, clean carburizing to high levels of carbon of the sensitive element 50 of detector 45. This is especially likely to occur for lower temperatures (of the order of 1500° F.) of the detector. Specifically in FIG. 4, under equilibrium conditions, the sample stream is passed via line 16 and open valve 58A to the input line 60 of detector 45, but passage of gas from generator output line 15 is blocked by the closed valve 58B.

When solenoids 59A, 59B are energized under control of controller 52 associated with detector 45, the valves 58A, 58B are operated to cut off flow of the sample stream to the detector and to provide for flow of the well reacted carrier gas from the gas generator 20 (FIG. 1). The two valves 58A, 58B may, of course, be replaced by a single two-way valve such as valve 58 of FIG. 2 operable by a single solenoid.

Figure 5:
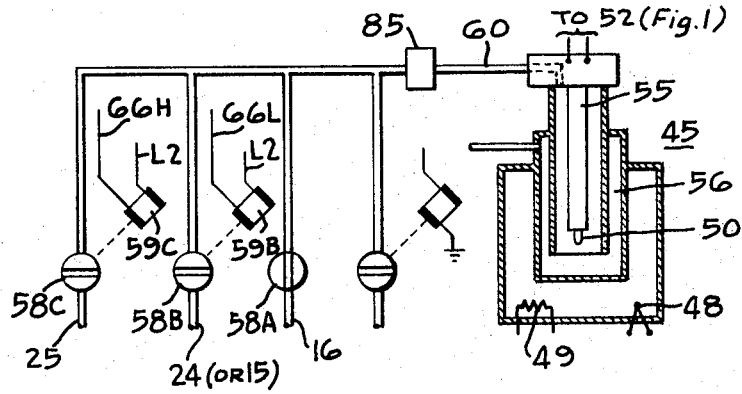

The arrangement shown in FIG. 5 is similar to that of FIGS. 3 and 4, but additionally includes valve means for substituting for, or modifying, the sample stream, using carrier gas from the generator 30 or fuel gas. Also, a gas such as air, may be added to the sample stream to accelerate the response of detector 45 in opposite sense when the treating gas is above the set-point. As in FIGS. 3 and 4, when the response of the detector 45 is below the set-point of controller 52, the normally-closed valve 58B is pulsed to provide a more effective carburizing gas than the sample from the work furnace. When the response of the detector 45 is above the set-point of controller 52, the normally-closed valve 58C is pulsed to modify the sample stream to provide an effective decarburizing gas, for example, by adding air from line 25 (FIG. 1). The solenoid 59C for operating valve 58C may be connected to the high contact 66H of the relay 65 (FIG. 1). In some installations, it is desirable, as shown in FIG. 5, to provide the intake line 60 of detector 45 with a storage tank 85 to attenuate, or smooth, the effect of the materials added to the sample stream of treating atmosphere or substituted for it.

Figure 5A:
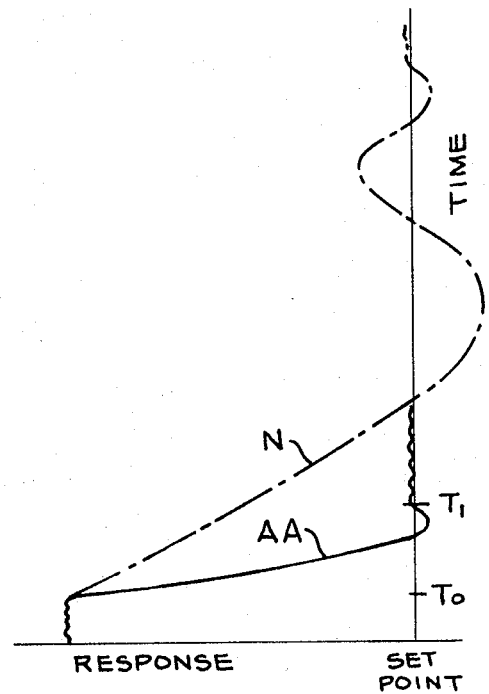
FIG. 5A is a curve referred to in discussion of the arrangement of FIG. 5.

With the arrangement of FIG. 5, the accelerated response of detector 45 is exemplified by Curve AA of FIG. 5A. Its general shape and slope is similar to Curve A of FIG. 1A, but is absent the serrations corresponding with repeated short-period pulsing at or near the set-point until equilibrium is established. As with all of the preceding arrangements, the time required to reach equilibrium after start of a run, or after change of one set-point to another, is improved by a factor of 2 to 10 as compared with the time to reach equilibrium when only the sample stream is supplied to detector 45, as in prior practice. The Curve N, as in FIG. 1A, is exemplary of the slow overshooting carburizing potential characteristic of such prior practice.

Figure 6:
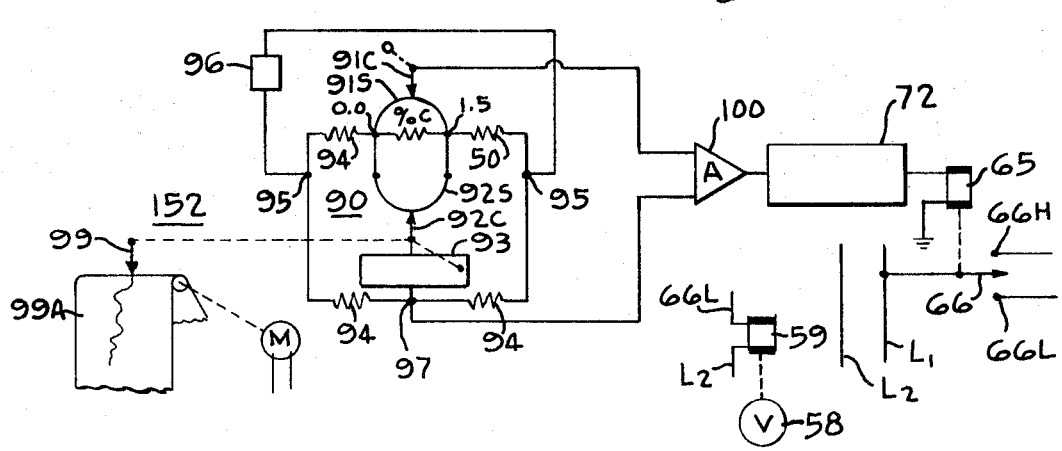
FIG. 6 is illustrative of a network including a recorder and controller for use in the systems of FIGS. 1–5.

A suitable network for the controller 52 used with the preceding accelerated detector response and control arrangements is shown in FIG. 6. The dual bridge 90 includes a set-point slidewire 91S having a relatively adjustable contact 91C manually set to the desired percent-carbon and a rebalancing slidewire 92S having a relatively adjustable contact 92C which is automatically movable by the known follow-up amplifier-motor arrangement 93. The sensitive element 50 of the constituent-potential detector 45 is included in an arm common to both bridges; other common arms of the bridges include fixed resistances 94.

The voltage supplied to terminals 95, 95 of network 90 may be provided by the source 96. The input to the amplifier of the follow-up arrangement 93 is the unbalanced signal between contact 92C of slidewire 92S and output terminal 97 of network 90. This unbalance signal is zero when contact 92C is in position for which the inner bridge, including slidewire 92S and detector element 50, is in balance. Whenever the inner bridge is unbalanced by change in resistance of the sensitive element 50 of detector 45, the motor of the follow-up arrangement 93 adjusts the slidewire contact 92S to restore balance and concurrently moves a marker 99 across a recorder chart 99A to the value corresponding with the new balance point.

The input to the controller-amplifier 100 is the unbalance signal of the outer bridge between terminal 97 and the contact 91C of the set-point slidewire 91S. This unbalance signal is zero when the gas in contact with the sensitive element 50 of detector 45 is at the carburizing set-point. For this condition, the relay 65 in the output circuitry of amplifier 100 is deenergized and its movable contact 66 is in open-circuit position. If the carburizing potential of the atmosphere sample, as sensed by detector element 50, is above or below the set-point, the unbalance signal between points 91C and 97 is of corresponding sense. The signal, as enhanced by amplifier 100, energizes the relay 65 to move its contact 66 into engagement with fixed contact 66H or 66L to actuate the various control valves 38, 39, 40 of FIG. 1, and also the valve 58 or 58A, 58B or 58C of FIGS. 1–7 to control supply to detector 45, as above explained, of the unmodified sample stream and of the modified sample stream which accelerates the detector response.

Figure 7:
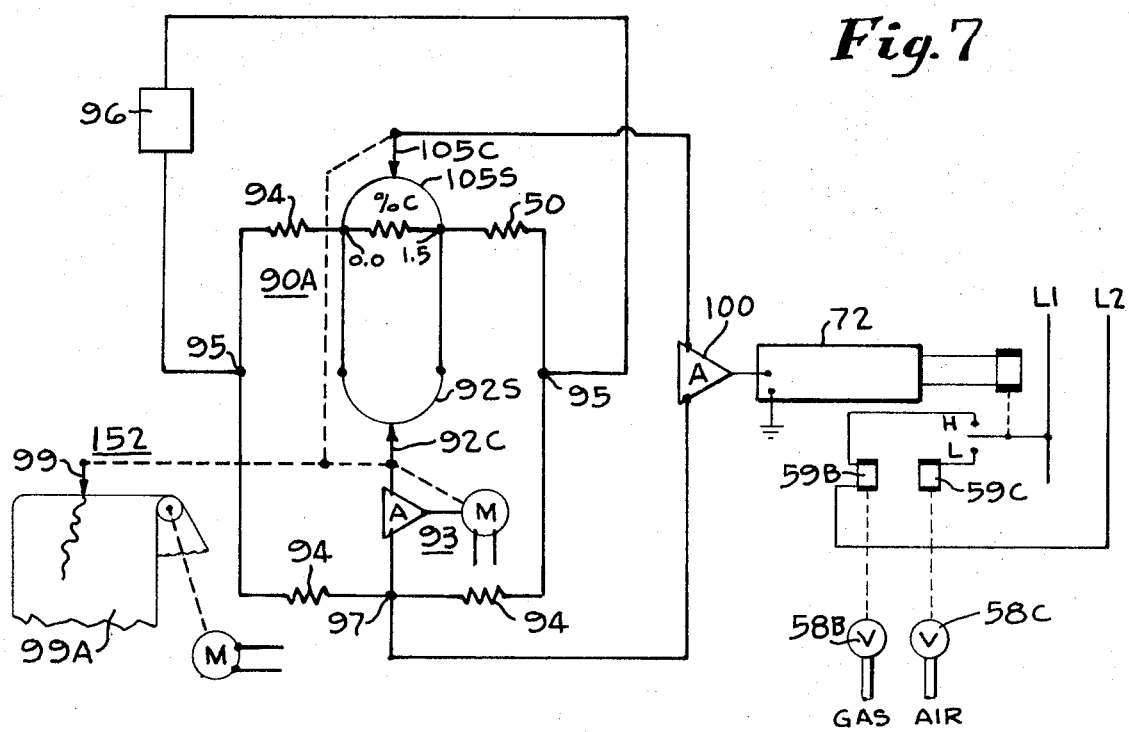
FIG. 7 is illustrative of a recorder-controller network for monitoring use.
Figure 8:
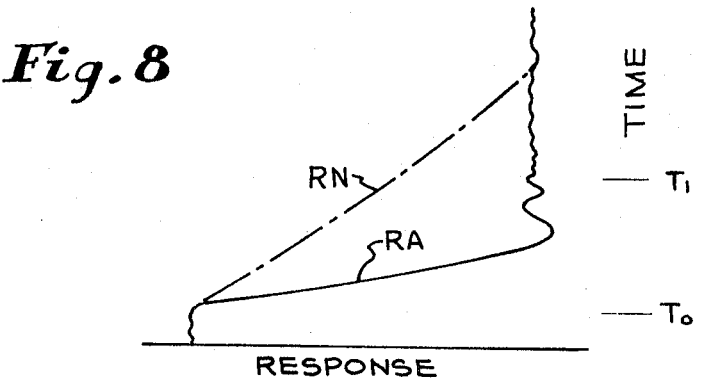
FIG. 8 is an explanatory figure referred to in discussion of FIG. 7.

For simply monitoring the constituent-potential of a treating gas with provision for reducing the time required for the composition of the sensitive element 50 to reach equilibrium with the gas, the recorder 152 of FIG. 7 may be used with the network 90A similar to network 90 of FIG. 6 except that the set-point slidewire 91S is replaced by a controller slidewire 105S repositioned relative to its contact 105C concurrently with automatic rebalancing adjustment of the slidewire 92S relative to its contact 92C. So long as the rebalancing slidewire 92C is being adjusted by the motor of the follow-up arrangement 93 toward a rising carburizing potential, as sensed by element 50, the unbalance signal of the outer bridge, including the controller slidewire 105S, is effective to supply the detector with gas which accelerates detector response. This unbalance signal, as in FIG. 6, is temporarily applied via amplifier 100 to the control solenoid of valve 58B or 58C or equivalent as in the preceding figures. In order for amplifier 100 to produce the described response-acceleration actions, it should be of high order of sensitivity, relatively greater than the sensitivity of the amplifier in the follow-up system 93. In other words, the amplifier 100 must see and respond to changes in the detector before the follow-up system amplifier can see and respond to those changes. As indicated by Curve RA of FIG. 8, the detector response rapidly settles down to equilibrium with the sample of furnace atmosphere, whereas without modification of the sample gas, as by modification of a sample of the furnace atmosphere, or temporary substitution therefor, a much longer time is required, as exemplified by Curve RN for the detector response to reach equilibrium.

The programmer 72 shown in block in FIGS. 1, 6 and 7 is a time-controlled arrangement of valves and switches switching the measuring and control functions from one sample stream to another. This switching simultaneously suspends the sample flow from one point of control, drops out of circuit the corresponding set-point slidewire, and disconnects from the controller output the connections of the corresponding control valves, and drops out any corresponding temperature-compensating circuitry. The switching action thereupon immediately initiates sample flow from a different sample point, ties in the corresponding set-point slidewire, together with any related work temperature-compensation circuitry, and sets up connections to the corresponding control valves, the latter to be actuated after expiration of a predetermined equilization period for achievement of significant measurement. The recording function, if used, is also switched or suitably indexed to identify the new control point under surveillance.

What is claimed is:

1. In a system for controlling the constituent-potential of a constituent of a heat-treating atmosphere and in which a detector has an electrical characteristic which varies as a function of transfer of said constituent between it and its atmosphere, a method of shortening the time required for the detector to attain equilibrium with the heat-treating atmosphere which comprises
supplying the detector with a sample stream of the heat-treating atmosphere, and
during deviation of the detector response from a desired set point, temporarily replacing said sample stream, at least in part, by gas of composition or condition which accelerates the change in said electrical characteristic so that the detector response more closely approaches the equilibrium it should have for said set-point when again subjected to the sample stream of the heat-treating atmosphere.

2. A method as in claim 1 in which the constituent-transfer ability of the sample stream of heat-treating atmosphere is temporarily increased by subjecting it to a catalyst.

3. A method as in claim 1 in which the constituent-transfer ability of the sample stream of heat-treating atmosphere is temporarily modified by addition of gas having higher constituent-potential.

4. A method as in claim 1 in which the constituent-transfer ability of the sample stream of heat-treating atmosphere is temporarily modified by addition of gas having a lower constituent-potential.

5. A method as in claim 1 in which the sample stream of heat-treating atmosphere is temporarily replaced by another gas of different constituent-potential.

6. A method as in claim 1 in which
for deviations below the set point, temporarily modifying the sample stream of heat-treating atmosphere by addition of gas having higher constituent-potential, and
for deviations above the set point, temporarily modifying the sample stream of heat-treating atmosphere by addition of air.

7. In a system for measuring the constituent-potential of a constituent of a heat-treating atmosphere and in which a detector has an electrical characteristic which varies as a function of transfer of said constituent between it and its atmosphere, a method of shortening the time required for the detector to attain equilibrium with the heat-treating atmosphere which comprises
supplying the detector with a sample stream of the heat-treating atmosphere, and
during change of said electrical characteristic in a sense corresponding to an increase or decrease of constituent-potential temporarily replacing said sample stream, at least in part, by gas of composition or condition which accelerates the change in said electrical characteristic so that when again subjected to the sample stream of heat-treating atmosphere the detector response more closely approaches the equilibrium it would ultimately achieve with said sample stream.

8. In a system for measuring and/or controlling the constituent-potential of a constituent of a heat treating atmosphere within a chamber of a heat treating furnace, said system including,
supply means connected to said furnace chamber for providing a heat treating atmosphere therein, said supply means including means for increasing or decreasing the constituent-potential of the heat treating atmosphere supplied to the furnace chamber in response to an electrical signal,
a detector having an electrical characteristic which varies as a function of transfer of said constituent between it and its atmosphere,
a sample flow path connecting said furnace chamber to said detector, thereby to provide for passage of a sample of the heat treating atmosphere within said furnace chamber to said detector,
means responsive to the electrical characteristic of said detector for generating an electrical signal when said detector senses a deviation of the sample atmosphere constituent-potential from a set point value, said electrical signal controlling said supply means to increase or decrease the constituent-potential of the atmosphere supplied to the furnace chamber until the constituent-potential of the furnace chamber atmosphere is brought to said set point, and means connected directly to said sample flow path for increasing or decreasing the constituent-potential of the atmosphere in said sample flow path prior to the sample atmosphere reaching the detector without directly affecting the composition of the atmosphere within said furnace chamber;

the improvement comprising a motor operated valve means responsive to said electrical signal for controlling said means connected directly to said sample flow path to temporarily increase or decrease the constituent-potential of the atmosphere in said sample flow path simultaneously with said increase or decrease of the constituent-potential of the atmosphere supplied to the furnace chamber, thereby to accelerate return of the detector toward said set point value.

9. A system as in claim 8 in which said means connected directly to said sample flow path includes a catalyst, and in which the motor-operated valve means directs flow of said sample of heat-treating atmosphere through said sample flow path for passage first to said catalyst and then to said detector to temporarily increase the constituent-potential of the atmosphere in said sample flow path.

10. A system as in claim 8 in which said means connected directly to said sample flow path includes a source gas, and in which the motor-operated valve means effects a temporary introduction of gas from said source of gas to replace, at least in part, the heat-treating atmosphere in said sample flow path to said sensing element upon deviation from the set-point.

11. A system for measuring the constituent-potential of a constituent of a heat-treating atmosphere, said system including:

valve means for controlling atmosphere components in said system, a detector having an electrical characteristic which varies as a function of transfer of said constituent between it and its atmosphere, a measuring circuit including said detecetor, said measuring circuit including means to establish a set point, and means operable to effect actuation of valves of said valve means in one sense upon an increase from set point as indicated by the detector and operable in another sense upon decrease from set point as indicated by the detector, a flow path for pasage of heat-treating atmosphere from a chamber of a heat-treating furnace to a sensing element of said detector, and means connectable in said flow path between said chamber and said detector as a result of said actuation of valves of said valve means to effect a temporary change in the atmosphere flowing in said flow path to said sensing element to produce flow of an atmosphere to said sensing element capable of accelerating the change in said electrical characteristic so that when again subjected to the sample stream of heat-treating atmosphere upon cessation of said valve acturations the detector response more closely approaches the equilibrium it would ultimately achieve with said sample stream of heat treating atmosphere.

References Cited

UNITED STATES PATENTS 3,084,999    4/1963    Davis II _____ 23—232

REUBEN FRIEDMAN, Primary Examiner

R. M. REESE, Assistant Examiner

U.S. Cl. X.R.

23—254, 255